United States Patent
Takeshita et al.

(10) Patent No.: US 10,499,266 B2
(45) Date of Patent: Dec. 3, 2019

(54) COMMUNICATION-SPEED-LIMITED USER EXTRACTION APPARATUS, THROUGHPUT ESTIMATION APPARATUS, COMMUNICATION-SPEED-LIMITED USER EXTRACTION METHOD, THROUGHPUT ESTIMATION METHOD, COMMUNICATION-SPEED-LIMITED USER EXTRACTION PROGRAM, AND THROUGHPUT ESTIMATION PROGRAM

(71) Applicant: NIPPON TELEGRAPH AND TELEPHONE CORPORATION, Chiyoda-ku (JP)

(72) Inventors: Kei Takeshita, Musashino (JP); Hiroshi Yamamoto, Musashino (JP); Kazumichi Sato, Musashino (JP); Taichi Kawano, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 10 days.

(21) Appl. No.: 15/578,067

(22) PCT Filed: Apr. 19, 2016

(86) PCT No.: PCT/JP2016/062365
§ 371 (c)(1),
(2) Date: Nov. 29, 2017

(87) PCT Pub. No.: WO2016/194498
PCT Pub. Date: Dec. 8, 2016

(65) Prior Publication Data
US 2018/0176804 A1    Jun. 21, 2018

(30) Foreign Application Priority Data

Jun. 2, 2015 (JP) .................................. 2015-112634

(51) Int. Cl.
*H04W 24/08* (2009.01)
*H04L 12/26* (2006.01)
(Continued)

(52) U.S. Cl.
CPC ............ *H04W 24/08* (2013.01); *G06F 17/18* (2013.01); *H04L 43/0888* (2013.01);
(Continued)

(58) Field of Classification Search
CPC ....... H04W 24/08; H04W 8/18; H04W 8/183; G06F 17/18; H04L 43/0888; H04L 47/822; H04M 11/00
See application file for complete search history.

(56) References Cited

U.S. PATENT DOCUMENTS

| | | | | |
|---|---|---|---|---|
| 2009/0069037 A1* | 3/2009 | Gan | .................. | H04W 4/12 455/466 |
| 2009/0070743 A1* | 3/2009 | Alfors | .................. | G06F 11/3604 717/125 |
| 2012/0147758 A1* | 6/2012 | Pang | .................... | H04L 43/026 370/252 |

FOREIGN PATENT DOCUMENTS

| | | |
|---|---|---|
| JP | 2013-21713 A | 1/2013 |
| JP | 2014-107825 A | 6/2014 |

OTHER PUBLICATIONS

International Search Report dated Jul. 19, 2016 in PCT/JP2016/062365 filed Apr. 19, 2016.
(Continued)

*Primary Examiner* — Kodzovi Acolatse
*Assistant Examiner* — Jay L Vogel
(74) *Attorney, Agent, or Firm* — Oblon, McClelland, Maier & Neustadt, L.L.P.

(57) ABSTRACT

A communication-speed-limited user extraction apparatus for extracting a user whose communication speed is limited
(Continued)

based on communication histories includes a communication history storage unit configured to store the communication histories including throughput information on a user-by-user basis; and a communication-speed-limited user determination unit configured to extract a communication history with a same communication environment at a communication date and time within a predetermined period of time from the communication history storage unit and determine that a user with a different throughput distribution is the user whose communication speed is limited.

8 Claims, 7 Drawing Sheets

(51) Int. Cl.
*G06F 17/18* (2006.01)
*H04W 8/18* (2009.01)
*H04L 12/911* (2013.01)
*H04M 11/00* (2006.01)
*H04L 12/24* (2006.01)
*H04W 72/04* (2009.01)
*H04L 12/813* (2013.01)

(52) U.S. Cl.
CPC ............ *H04L 47/822* (2013.01); *H04M 11/00* (2013.01); *H04W 8/183* (2013.01); *H04L 41/142* (2013.01); *H04L 47/20* (2013.01); *H04W 72/0413* (2013.01)

(56) References Cited

OTHER PUBLICATIONS

"DOCOMO Speed Test Application" [URL: https://www.nttdocomo.co.jp/support/area/speed_test/], Retrieved from the Internet on Apr. 22, 2015, 3 Pages (with partial English language translation).

"DOCOMO Price Plan" [URL: https://www.nttdocomo.co.jp/charge/new_plan/bill_plan/index.html], Retrieved from the Internet on Apr. 22, 2015, 11 Pages (with partial English language translation).

"IIJmio Services" [URL: https://www.iijmio.jp/hdd/service/about.jsp?I=0m401b], Retrieved from the Internet on Apr. 22, 2015, 6 Pages (with partial English language translation).

"Survey on LTE/4G communication speed at 500 major stations in the country" [URL: http://consult.nikkeibp.co.jp/consult/news/2014/1023lte], Retrieved from the Internet on Apr. 22, 2015, 4 Pages (with partial English language translation).

Rich Wolski, et al., "The Network Weather Service: A Distributed Resource Performance Forecasting Service for Metacomputing" Future Gener. Comput. Syst., 1999, 19 Pages.

"National Broadband Map" NTIA & FCC, [URL: http://www.broadbandmap.gov/], Retrieved from the Internet on Apr. 22, 2015, 1 Page.

* cited by examiner

| USER ID | CARRIER | COMMUNICATION SPEED |
|---------|---------|---------------------|
| aaa | AAA | 200kbps |
| bbb | AAA | 400kbps |
| ccc | BBB | 128kbps |

FIG.9

COMMUNICATION-SPEED-LIMITED USER EXTRACTION APPARATUS, THROUGHPUT ESTIMATION APPARATUS, COMMUNICATION-SPEED-LIMITED USER EXTRACTION METHOD, THROUGHPUT ESTIMATION METHOD, COMMUNICATION-SPEED-LIMITED USER EXTRACTION PROGRAM, AND THROUGHPUT ESTIMATION PROGRAM

TECHNICAL FIELD

The present invention relates to a communication-speed-limited user extraction apparatus, a throughput estimation apparatus, a communication-speed-limited user extraction method, a throughput estimation method, a communication-speed-limited user extraction program, and a throughput estimation program, and specifically relates to a technique of identifying a user whose communication speed is limited and a technique of estimating throughput in consideration of a user whose communication speed is limited.

BACKGROUND ART

As a background art, a) a technique of measuring a communication speed in a network, b) a technique of controlling a communication speed, and c) a technique of estimating throughput are described. Then, an effect of the technique of controlling the communication speed on the technique of estimating throughput is described.

a) A Technique of Measuring a Communication Speed in a Network

Information about an actual communication speed over a network to be accessed has a large influence on decision on a contract network operator and decision on an application to be used. However, information about the actual communication speed is not publicly available by the network operator. This is because a network service targeted for mass markets is a best effort service, in which only a maximum speed is determined within specifications and an actual communication speed depends on the number of users accommodated by each base station and/or each accommodation station, and thus the actual communication speed cannot be guaranteed.

However, a user needs information about an actual communication speed for selecting a network operator or a service to be used. For this reason, communication speeds on many services and media are measured and the measured result is released. One example is docomo (registered trademark) speed test that is an application for a smartphone (see Non-Patent Document 1). In this service, communication is performed between a server for speed measurement installed by a service provider and a user terminal, and an actually measured communication speed is displayed.

b) A Technique of Controlling a Communication Speed

Currently, a mobile network operator, in particular, sets an upper limit on a total data communication volume available to a user during a predetermined period of time due to an increase in a data communication volume used by applications. For example, each main MNO (mobile network operator) currently sets an upper limit on an available data communication volume depending on contract conditions and a communication speed is limited when a data communication volume exceeds the upper limit. For example, in a certain network service, a best effort service according to a specification of a base station is provided until a data communication volume exceeds the upper limit of 5 GB per month and when the data communication volume exceeds the upper limit, the communication speed is limited to a very low communication speed such as 128 kbps (see Non-Patent Document 2). In addition, most MVNOs (mobile virtual network operators), each of which is a virtual network operator using lines owned by an MNO, provide a network service in which a high speed data communication volume is low or zero (limitation on a low communication speed is imposed from the beginning) while a contract price is low, thereby differentiating themselves from the MNO (see Non-Patent Document 3).

c) A Technique of Estimating Throughput

In order to estimate a communication speed, an approach is provided for estimating the communication speed with reference to previous communication histories under the same environment. This approach make use of network constancy with respect to time and location. As examples of this approach, a media gathers measurement information about a communication speed and releases the measurement information by areas or by operators (see Non-Patent Document 4), and considerations are made for allocating resources in cloud computing or the like using information about the amount of traffic in network apparatuses or the like (see Non-Patent Document 5).

According to this estimation approach, conditions regarding time, a location, and so on are determined, a communication speed is measured for each condition over several times, and its average value is published. Since a bottleneck frequently arises in a base station in the case of a mobile network or in a connection point between an ISP (Internet Service Provider) and a carrier or between ISPs in the case of a fixed line, a communication speed is measured for each condition of the base station or the connection point.

Prior-Art Documents

Non-Patent Documents

[Non-Patent Document 1] "DOCOMO Speed Test Application", Internet <URL https://www.nttdocomo.co.jp/support/area/speed_test/>, retrieved on Apr. 22, 2015.

[Non-Patent Document 2] "DOCOMO Price Plan", Internet <URL https://www.nttdocomo.co.jp/charge/new_plan/bill_plan/index.html>, retrieved on Apr. 22, 2015.

[Non-Patent Document 3] "IIJmio Services", Internet <URL https://www.iijmio.jp/hdd/service/about.jsp?1=0m401b>, retrieved on Apr. 22, 2015.

[Non-Patent Document 4] "Survey on LTE/4G communication speed at 500 major stations in the country", Internet <URL http://consult.nikkeibp.co.jp/consult/news/2014/1023 lte/>, retrieved on Apr. 22, 2015.

[Non-Patent Document 5] Rich Wolski, Neil T. Spring, and Jim Hayes, 1999, "The network weather service: a distributed resource performance forecasting service for metacomputing", Future Gener. Comput. Syst. 15, 5-6 (October 1999), 757-768.

[Non-Patent Document 6] "NTIA&FCC National Broadband Map", Internet <URL http://www.broadbandmap.gov/>, retrieved on Apr. 22, 2015.

DISCLOSURE OF INVENTION

Problem(s) to be Solved by the Invention

The problem to be solved arises in the case where communication speeds of some users are limited due to control of the communication speeds as described in b) the technique of controlling a communication speed, when communication speeds are estimated as described in c) the technique of estimating throughput.

Taking a mobile network as an example, the order of the communication speed in the current LTE (Long Term Evolution) network is several megabits per second or several tens of megabits per second, whereas it will become several hundreds of kilobits per second when the communication speed is limited. In other words, a communication speed of a communication-speed-limited user is one-tenth to one one-hundredth of a communication speed of a non-communication-speed-limited user. Upon estimating a communication speed, if a communication-speed-limited user is included in data to be referred to, an average value of the measured communication speed is significantly decreased and thus an accurate estimate value of the communication speed cannot be calculated.

In addition, there is also a problem that when a communication-speed-limited user is not aware that the communication speed is actually limited and is of the belief that information about a released communication speed should apply, the released communication speed appears excessively high.

Therefore, in order to estimate throughput or the like, it is necessary to extract a communication-speed-limited user. It is an object of the present invention to provide a solution to extract a communication-speed-limited user based on communication histories and a solution to estimate throughput in consideration of the communication-speed-limited user.

Means for Solving the Problem(s)

In one aspect of the present invention, there is provision for a communication-speed-limited user extraction apparatus for extracting a user whose communication speed is limited based on communication histories, including:

a communication history storage unit configured to store the communication histories including throughput information on a user-by-user basis; and a communication-speed-limited user determination unit configured to extract a communication history with a same communication environment at a communication date and time within a predetermined period of time from the communication history storage unit and determine that a user with a different throughput distribution is the user whose communication speed is limited.

In another aspect of the present invention, there is provision for a throughput estimation apparatus for estimating throughput based on communication histories, including:

a communication history storage unit configured to store the communication histories on a user-by-user basis;

a communication-speed-limited user determination unit configured to extract a communication history with a same communication environment at a communication date and time within a predetermined period of time from the communication history storage unit and determine that a user with a different throughput distribution is a user whose communication speed is limited; and a communication speed estimation unit configured to estimate throughput regarding a communication speed in consideration of the user whose communication speed is limited.

In another aspect of the present invention, there is provision for a communication-speed-limited user extraction method for extracting a user whose communication speed is limited based on communication histories, including the steps of:

extracting a communication history with a same communication environment at a communication date and time within a predetermined period of time from a communication history storage unit configured to store the communication histories including throughput information on a user-by-user basis; and determining that a user with a different throughput distribution is the user whose communication speed is limited.

In another aspect of the present invention, there is provision for a throughput estimation method for estimating throughput based on communication histories, including the steps of:

extracting a communication history with a same communication environment at a communication date and time within a predetermined period of time from a communication history storage unit configured to store the communication histories on a user-by-user basis;

determining that a user with a different throughput distribution is a user whose communication speed is limited; and estimating throughput regarding a communication speed in consideration of the user whose communication speed is limited.

In another aspect of the present invention, there is provision for a communication-speed-limited user extraction program which causes a computer to extract a user whose communication speed is limited based on communication histories, the program causing the computer to function as:

a communication history storage unit configured to store the communication histories including throughput information on a user-by-user basis; and a communication-speed-limited user determination unit configured to extract a communication history with a same communication environment at a communication date and time within a predetermined period of time from the communication history storage unit and determine that a user with a different throughput distribution is the user whose communication speed is limited.

In another aspect of the present invention, there is provision for a throughput estimation program for causing a computer to estimate throughput based on communication histories, the program causing the computer to function as:

a communication history storage unit configured to store the communication histories on a user-by-user basis;

a communication-speed-limited user determination unit configured to extract a communication history with a same communication environment at a communication date and time within a predetermined period of time from the communication history storage unit and determine that a user with a different throughput distribution is a user whose communication speed is limited; and a communication speed estimation unit configured to estimate throughput regarding a communication speed in consideration of the user whose communication speed is limited.

Advantageous Effect of the Invention

According to the present invention, it is possible to extract a communication-speed-limited user based on communication histories.

DETAILED DESCRIPTION OF THE PREFERRED EMBODIMENTS

Embodiments of the present invention are described below with reference to the drawings.

In an embodiment of the present invention, there is described a communication-speed-limited user extraction apparatus for extracting a user communication histories. There is also described a throughput estimation apparatus for estimating throughput based on a result of extracting a user whose communication speed is limited.

Figure 1:
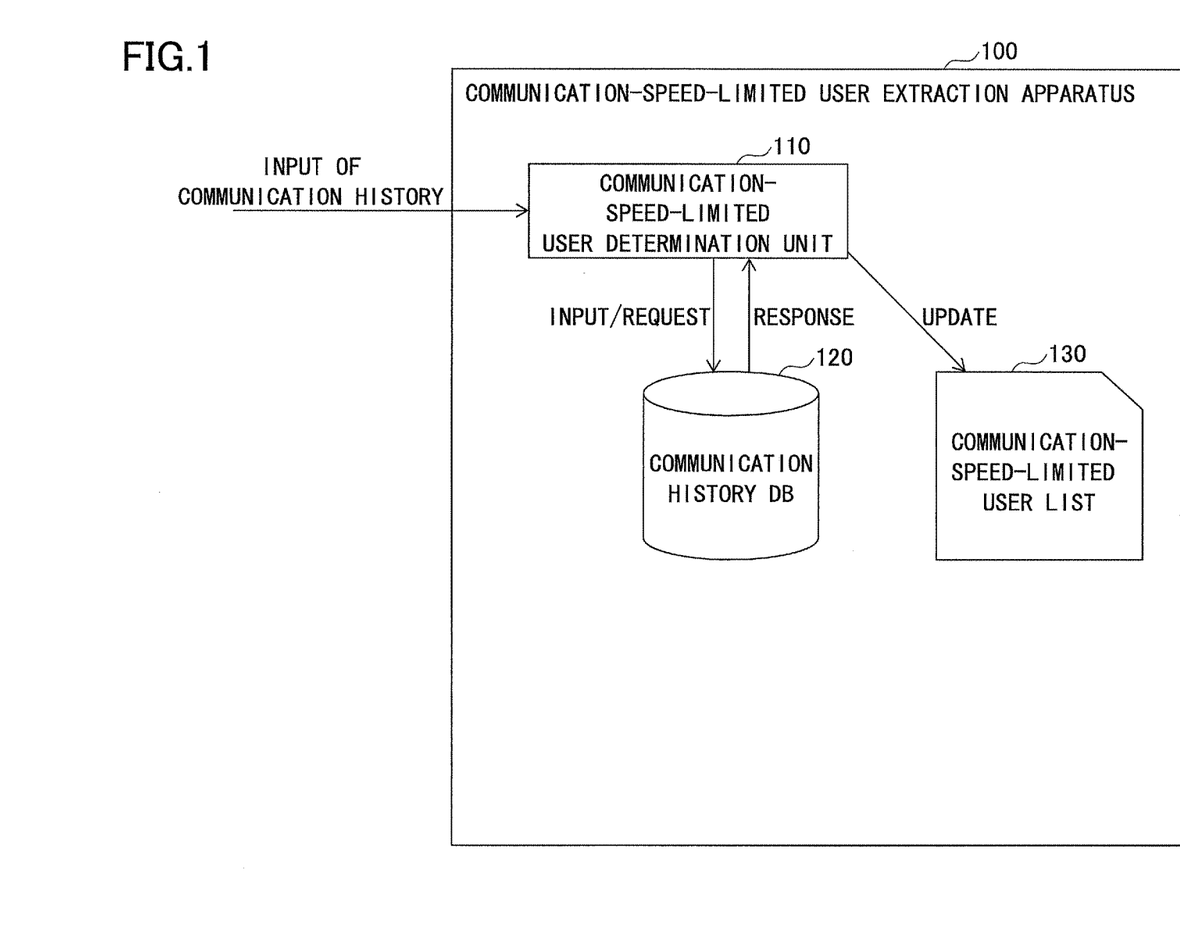
FIG. 1 illustrates a block diagram of a configuration of a communication-speed-limited user extraction apparatus according to an embodiment of the present invention.

FIG. 1 illustrates a configuration of a communication-speed-limited user extraction apparatus 100 according to an embodiment of the present invention. The communication-speed-limited user extraction apparatus 100 is an apparatus for extracting a user whose communication speed is limited based on communication histories, and includes a communication-speed-limited user determination unit 110 for determining the user whose communication speed is limited by inputting actual communication records, a communication history DB 120 for storing the communication histories, and a communication-speed-limited user list 130 for identifying the user whose communication speed is limited.

Figure 2:
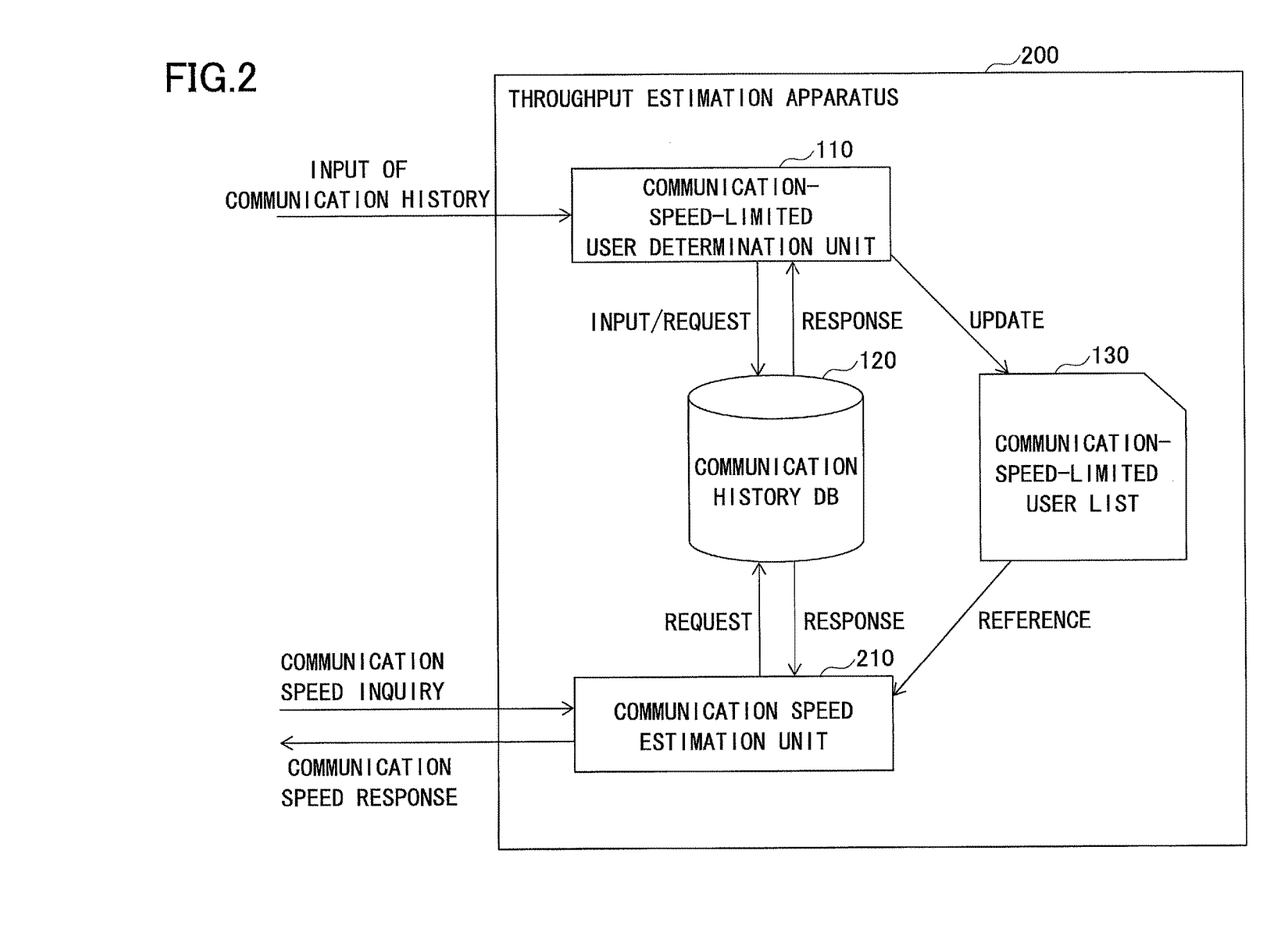
FIG. 2 illustrates a block diagram of a configuration of a throughput estimation apparatus according to an embodiment of the present invention.

FIG. 2 illustrates a configuration of a throughput estimation apparatus 200 according to an embodiment of the present invention, which is an example of applying the communication-speed-limited user extraction apparatus 100 to a network estimation technique. The throughput estimation apparatus 200 is an apparatus for estimating throughput based on communication histories, and includes a communication speed estimation unit 210 for estimating throughput based on a result of determination of the user whose communication speed is limited, in addition to the communication-speed-limited user determination unit 110, the communication history DB 120, and the communication-speed-limited user list 130.

Figure 3:
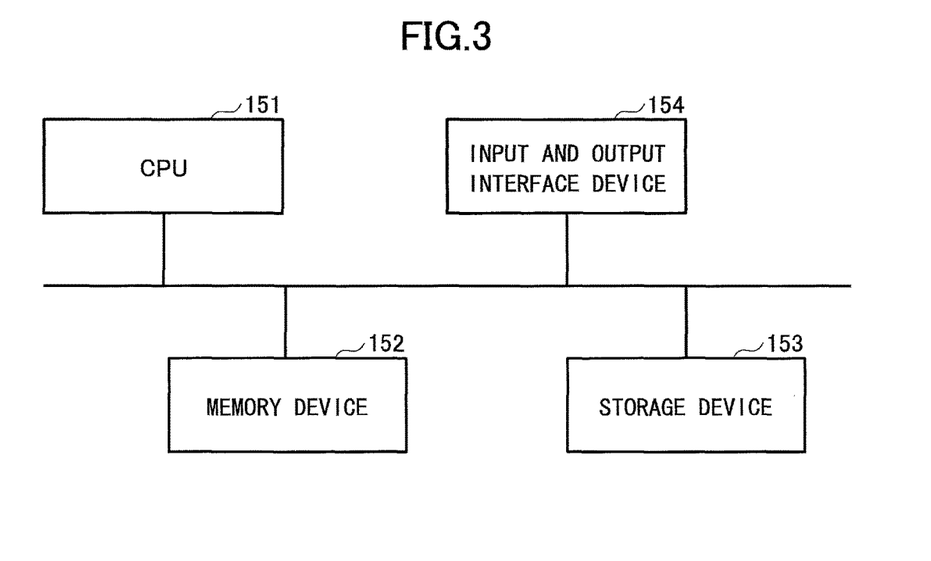
FIG. 3 illustrates an example of a hardware configuration of a communication-speed-limited user extraction apparatus or a throughput estimation apparatus according to an embodiment of the present invention.

FIG. 3 illustrates an example of a hardware configuration of the communication-speed-limited user extraction apparatus 100 or the throughput estimation apparatus 200 according to an embodiment of the present invention. The communication-speed-limited user extraction apparatus 100 or the throughput estimation apparatus 200 may be a computer including a processor 151 such as a CPU (Central Processing Unit), a memory device 152 such as a RAM (Random Access Memory) or a ROM (Read Only Memory), a storage device 153 such as a hard disk, and so on. For example, functions and operations of the communication-speed-limited user extraction apparatus 100 and the throughput estimation apparatus 200 are realized when the CPU processes data and executes a program stored in the storage device 153 or the memory device 152. Information necessary for the communication-speed-limited user extraction apparatus 100 and the throughput estimation apparatus 200 may be input by an input and output interface device 154 and a result obtained by the communication-speed-limited user extraction apparatus 100 and the throughput estimation apparatus 200 may be output by the input and output interface device 154.

First, with reference to FIG. 1, a solution to extract a user whose communication speed is limited is described.

The communication-speed-limited user determination unit 110 determines a user whose communication speed is limited based on communication histories that are actual communication records. Specifically, the communication-speed-limited user determination unit 110 receives communication histories including throughput information on a user-by-user basis and stores the communication histories in the communication history DB 120. Then, the communication-speed-limited user determination unit 110 extracts a communication history with the same communication environment at a communication date and time within a predetermined period of time, determine that a user with a different throughput distribution is the user whose communication speed is limited, and updates the communication-speed-limited user list 130.

As a format of the communication history, it is assumed that each communication history includes a communication date and time, a user ID, throughput information, carrier information, and network information. The carrier information is an identifier (ID) for identifying a contract network operator. The network information is an ID such as a base station ID in a mobile network, for identifying a point where a bottleneck may arise for a user whose communication speed is not limited. The network information may be a combination of a base station and a time frame when a base station ID is managed for each time frame.

When a communication history i is defined as $\text{Viewlog}_i$ and the communication history i includes a communication date and time d, a user ID u, throughput information t, carrier information c, and network information n, $\text{Viewlog}_i$ can be defined as $\text{Viewlog}_i = \{u_i, d_i, t_i, c_i, n_i\}$.

In order to determine whether a communication speed of a user (target) is limited by a network operator (carrier), m communication histories ($j_1, \ldots, j_m$) are extracted from the corresponding communication histories $\text{Viewlog}_j = \{\text{target}, d_j, t_j, \text{carrier}, n_j\}$ satisfying the condition that $d_j$ is within $th_{time}$ from the current time (currenttime). Then, a degree of deviation of the extracted m communication histories from a throughput distribution $t_k$ in the network generated by communication histories $$\text{Viewlog}_k = \{u_k \neq \text{target}, \text{currenttime} - th_{time} \leq d_k, t_k, c_k = \text{carrier}, n_k = n_{j_i}\}$$

of other users using the same network is determined.

The degree of deviation is determined based on testing or identification of a higher value. For example, it is assumed that the throughput distribution follows a logarithmic normal distribution. In this case, after logarithmic conversion of data, various testing (for example, a Smirnov-Grubbs test) can be used to determine an outlier relative to the normal distribution. Alternatively, a mechanism for simply detecting a value which falls within lower constant values can be used.

Figure 4:
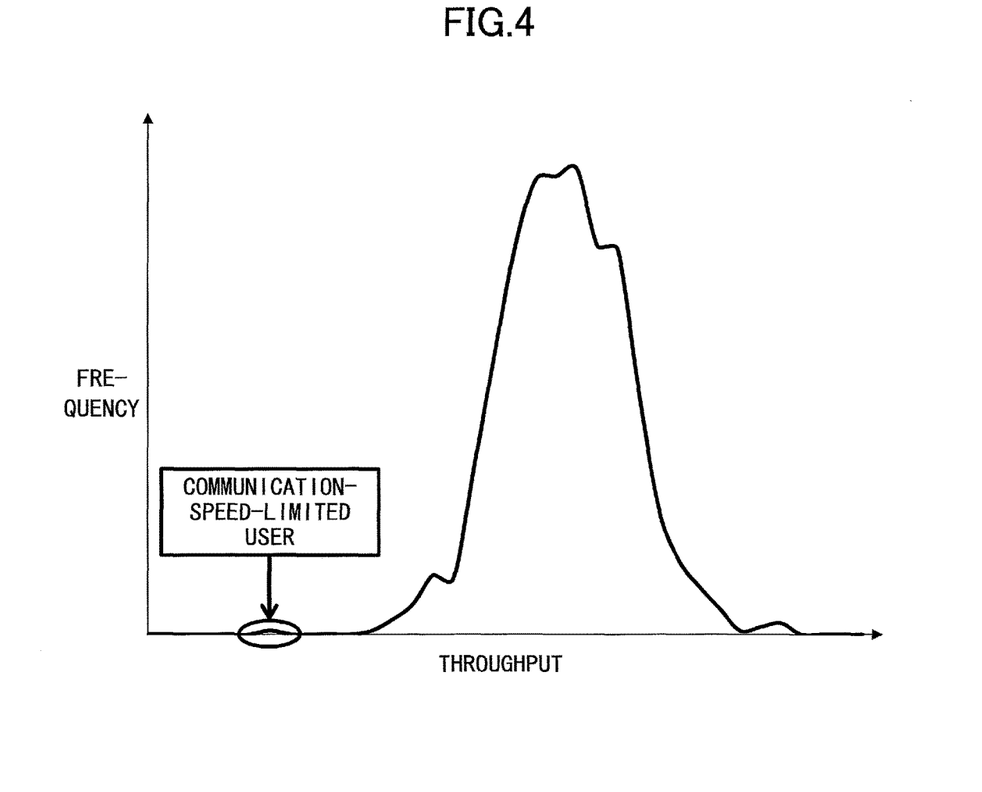
FIG. 4 illustrates an example of a throughput distribution.

FIG. 4 illustrates an example of the throughput distribution. The horizontal axis represents throughput and the vertical axis represents a frequency with which the throughput is measured. As illustrated in FIG. 4, a throughput distribution of a communication-speed-limited user is different from a throughput distribution of a non-communication-speed-limited user. The communication-speed-limited user can be determined based on testing or identification of a higher value as described above.

When the communication speed of the user (target) is limited, the throughput of the user is similarly limited anywhere in the same carrier, and thus it is likely that the throughput of the user deviates from the throughput distribution in the network. For this reason, when a predetermined number or a predetermined ratio of outliers or greater above a threshold $r_{th}$ are found in the communication histories $j_l, \ldots, j_m$, it is determined that the communication speed of the user is limited. The threshold $r_{th}$ is manually set by an operator of the communication-speed-limited user extraction apparatus 100 or the throughput estimation apparatus 200 with reference to the value of the limit of the communication speed, prevalence, or the like available from the services in the market.

Next, with reference to FIG. 2, a solution to apply the above-described solution to a throughput estimation technique is described.

As described with reference to FIG. 1, the communication-speed-limited user determination unit 110 determines a user whose communication speed is limited and updates the communication-speed-limited user list 130. The communication speed estimation unit 210 estimates throughput regarding a communication speed in consideration of the user whose communication speed is limited. For example, when a user submits a communication speed inquiry together with a user ID and carrier information in order to obtain the communication speed provided by the network operator, if the communication speed of the user is not limited, the communication speed estimation unit 210 estimates throughput without using a communication history of users whose communication speed is limited. On the other hand, if the communication speed of the user is limited, only throughput data of the user are used without referring to other users whose communication speed is not limited, thereby allowing estimation of throughput in consideration of the limitation of the communication speed.

In Non-Patent Document 4, in order to gather measurement information, a communication speed in each area (a station, a landmark, or the like) is measured and a statistic such as an average value, a maximum value, or a minimum value of the measurement result is reported. Upon calculating a representative value from the measurement result of the communication speed, if data of users whose communication speed is limited are included, the representative value is underestimated due to the limited communication speed. For this reason, by calculating the representative value without using the data of users whose communication speed is limited as described above, throughput can be accurately estimated.

In Non-Patent Document 4, the above-mentioned problem does not arise because a reporter manually excludes data of users whose communication speed is limited. However, when general users assume a role of measuring a communication speed, the above-mentioned problem becomes apparent.

In the following descriptions, each functional unit is discussed in detail.

Figure 5:
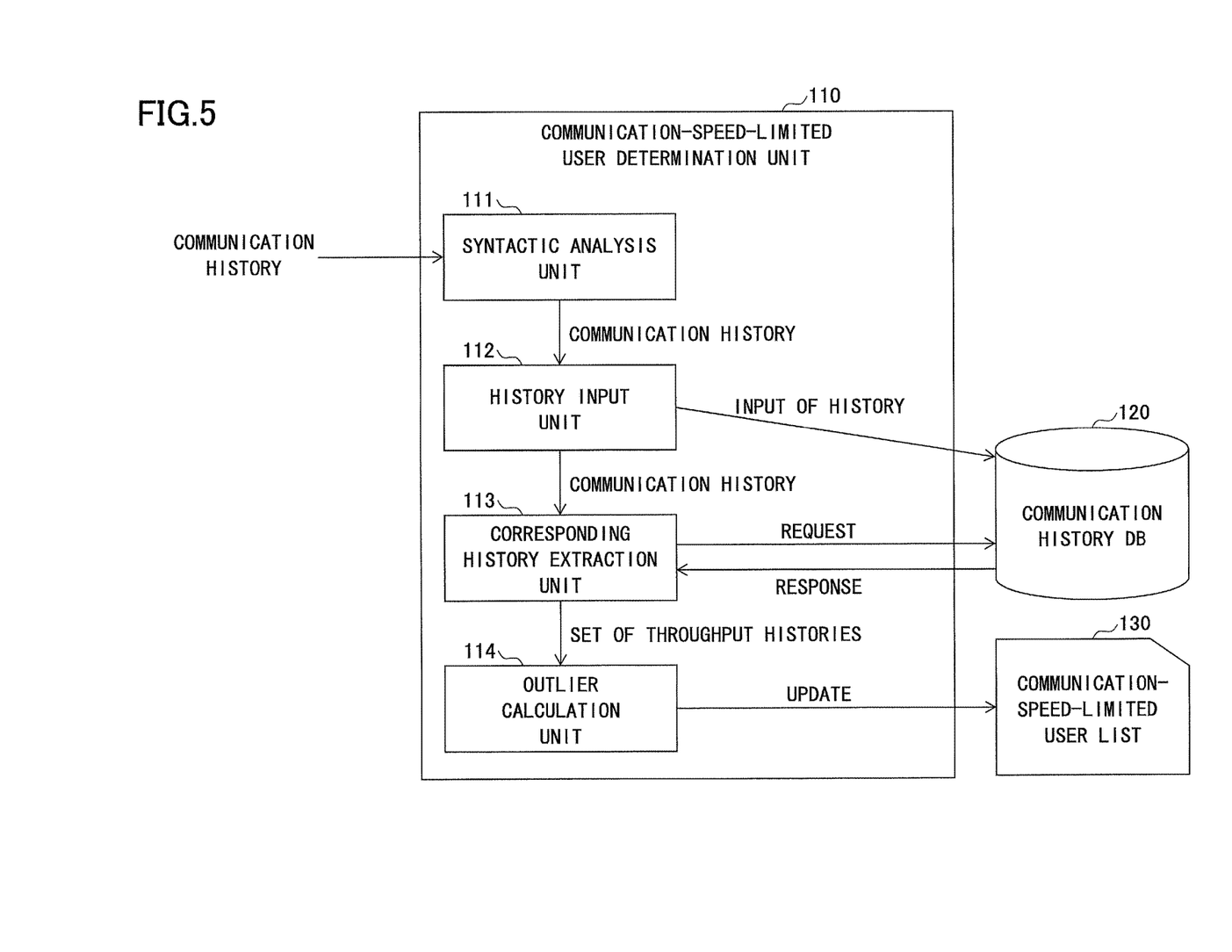
FIG. 5 illustrates a detailed block diagram of a communication-speed-limited user determination unit.

FIG. 5 is a detailed block diagram of the communication-speed-limited user determination unit 110. The communication-speed-limited user determination unit 110 includes a syntactic analysis unit 111, a history input unit 112, a corresponding history extraction unit 113, and an outlier calculation unit 114.

First, a communication history is input to the communication-speed-limited user determination unit 110. The communication history includes a communication date and time, a user ID, throughput information, carrier information, and network information.

The syntactic analysis unit 111 parses the input communication history in the form of json (JavaScript (registered trademark) Object Notation), xml (Extensible Markup Language), or the like, extracts each element as described above, and inputs the history input unit 112.

The history input unit 112 formats each element extracted from the communication history and inputs the element to the communication history DB 120. In addition, the history input unit 112 inputs the formatted communication history into the corresponding history extraction unit 113.

Figure 6:
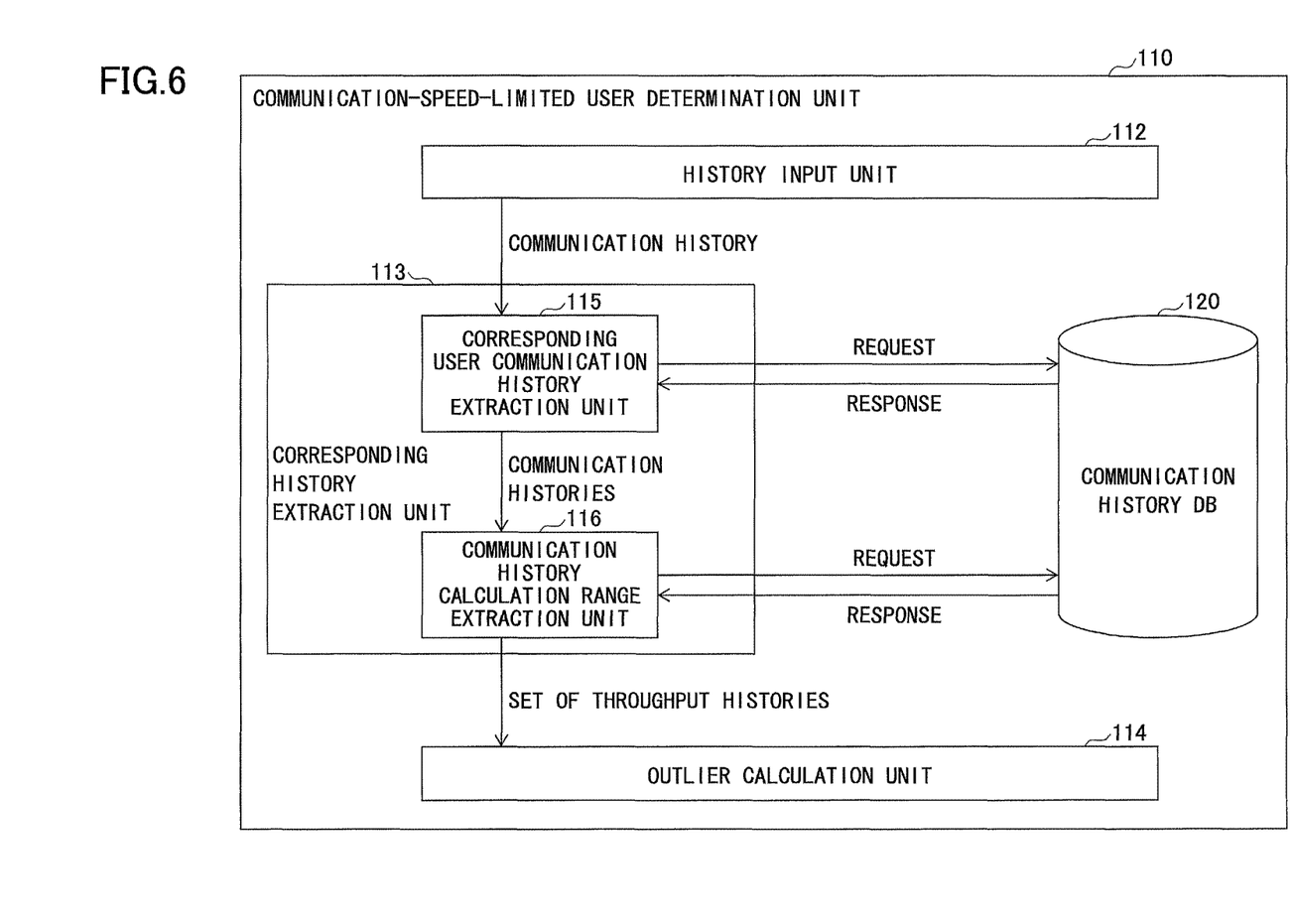
FIG. 6 illustrates a detailed block diagram of a corresponding history extraction unit.

The corresponding history extraction unit 113 includes a corresponding user communication history extraction unit 115 and a communication history calculation range extraction unit 116.

The corresponding user communication history extraction unit 115 extracts all communication histories, each of which has the same user ID and the same carrier information as the user ID and the carrier information included in the communication history input by the history input unit 112 and has a communication date and time within $th_{time}$, and inputs them into the communication history calculation range extraction unit 116. Then, the communication history calculation range extraction unit 116 obtains throughput information of communication histories $k_{i,1}, k_{i,2}, k_{i,3}, \ldots$ with the same carrier information $c_i$ and the same network information $n_i$ from the extracted communication histories $j_i$, and inputs the throughput information $t_i, t_{k_{i,1}}, t_{k_{i,2}}, \ldots, t_{k_{i,m}}$ into the outlier calculation unit 114.

Figure 7:
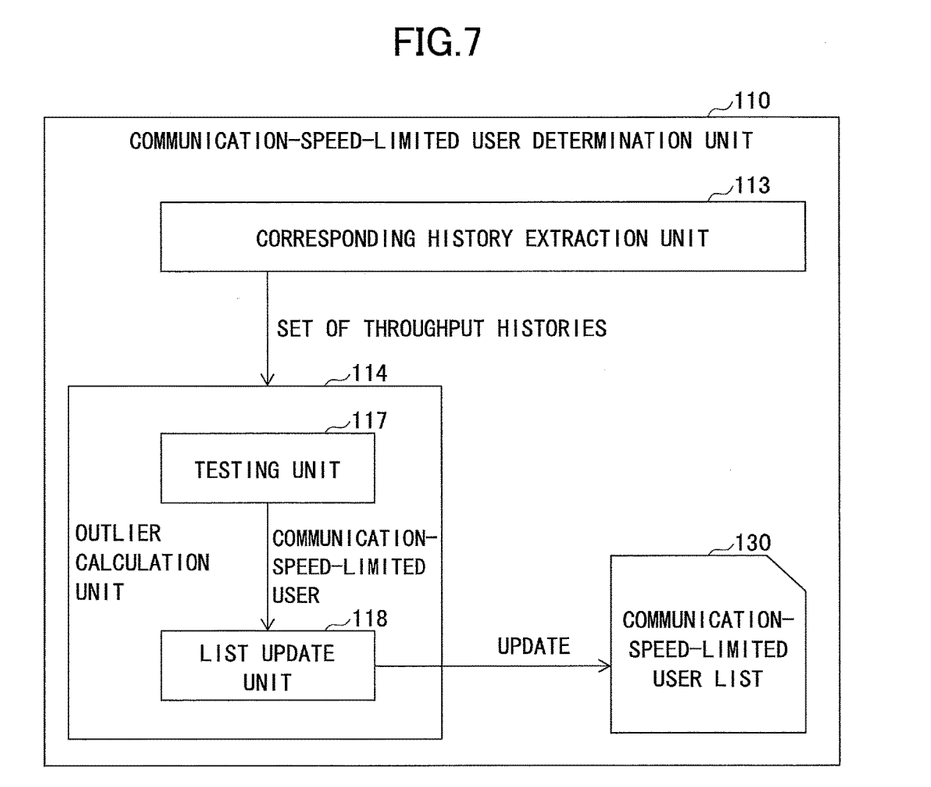
FIG. 7 illustrates a detailed block diagram of an outlier calculation unit.

As illustrated in FIG. 7, the outlier calculation unit 114 includes a testing unit 117 and a list update unit 118.

The testing unit 117 determines whether $t_i$ is an outlier relative to a distribution generated by $t_{k_{i,1}}, t_{k_{i,2}}, t_{k_{i,3}}, \ldots$ for each i by means of a Smirnov-Grubbs test. Since it is assumed that $t_{k_{i,1}}, t_{k_{i,2}}, t_{k_{i,3}}, \ldots$ follows a logarithmic normal distribution, the testing is performed after logarithmic conversion is completed for every t.

When $t_i$ is an outlier, it is understood that the user corresponding to the communication histories $j_i$ is a user whose communication speed is limited. For the user whose communication speed is limited, it is likely that throughput becomes an outlier in the same carrier even for differing network information. Thus, it is possible to improve the accuracy of determination of a user whose communication speed is limited by determining a user whose throughput follows a predetermined number of outliers in the same carrier, rather than by determining a user whose communication speed is limited based on a single outlier.

The list update unit 118 updates the communication-speed-limited user list 130 with $u_i$, $c_i$, and average $(t_i)$ determined for each i in which the communication speed is limited to a predetermined threshold or less by the testing unit 117, where average $(t_i)$ is an average value of the communication speed. In the case of a $u_i$ and $c_i$ being included in the communication-speed-limited user list 130 despite determination that the communication speed is not limited, the list update unit 118 deletes the item corresponding to the $u_i$ and $c_i$ from the communication-speed-limited user list 130.

Figure 8:
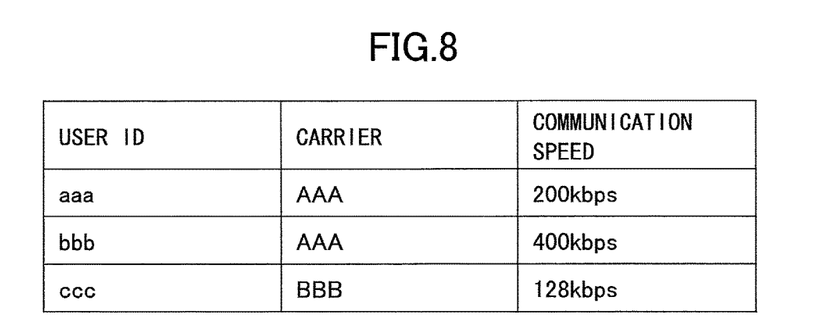
FIG. 8 illustrates an example of a communication-speed-limited user list.

As illustrated in FIG. 8, the communication-speed-limited user list 130 stores a user ID, carrier information, and a communication speed.

In FIGS. 5 and 6, a communication history which matches the condition is extracted based on a single communication history. However, it is possible to directly extract communication histories with a communication date and time within $th_{time}$ from the communication history DB 120 to calculate an outlier.

Figure 9:
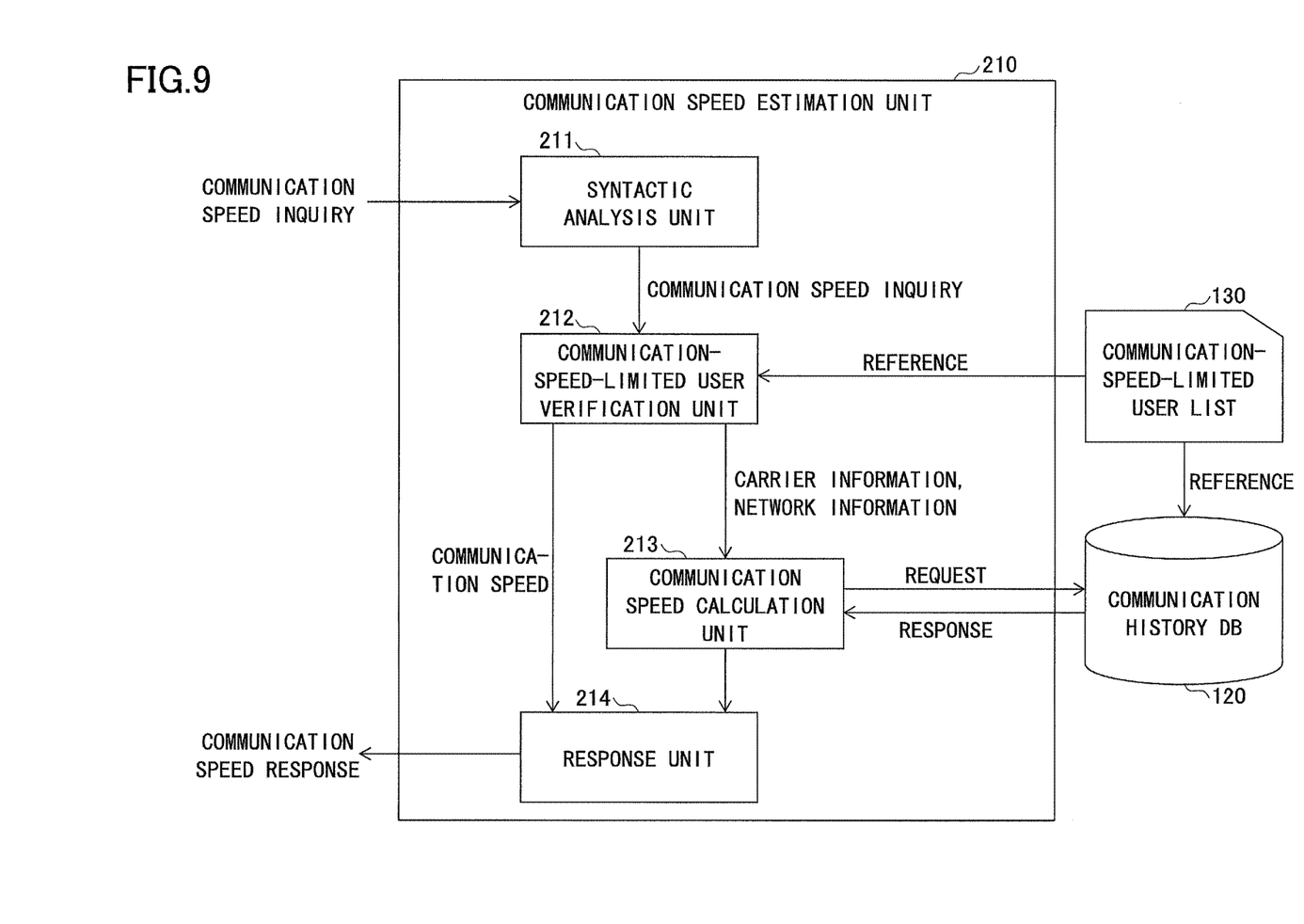
FIG. 9 illustrates a detailed block diagram of a communication speed estimation unit.

Next, the communication speed estimation unit 210 is described. As illustrated in FIG. 9, the communication speed estimation unit 210 includes a syntactic analysis unit 211, a communication-speed-limited user verification unit 212, a communication speed calculation unit 213, and a response unit 214.

In a similar manner to the communication-speed-limited user determination unit 110, the syntactic analysis unit 211 in the communication speed estimation unit 210 parses a communication speed inquiry into elements of a user ID $u_i$, carrier information $c_i$, and network information $n_i$. Then the communication-speed-limited user verification unit 212 determines whether the communication speed of the user is limited based on $u_i$ and $c_i$. When the user is included in the communication-speed-limited user list 130, the response unit 214 returns the throughput recorded in the communication-speed-limited user list 130 as a communication speed response to the communication speed inquiry. When the user is not included in the communication-speed-limited user list 130, the communication speed calculation unit 213 extracts communication histories $j_i$ with the same $c_i$ and the same $n_i$ from the communication history DB 120 (if there is carrier information $c_i$ corresponding to the user whose communication speed is limited, its communication history is excluded). Then, the communication speed calculation unit 213 calculates a representative value such as an average value of throughput information $t_{j_i}$ included in the extracted communication histories $j_i$ and returns a communication speed response to the communication speed inquiry via the response unit 214.

<Effects of an Embodiment of the Present Invention>

According to an embodiment of the present invention, it is possible to extract a communication-speed-limited user based on communication histories and estimate throughput in consideration of the communication-speed-limited user.

For convenience of explanation, the communication-speed-limited user extraction apparatus and the throughput estimation apparatus according to the embodiments of the present invention have been described with reference to functional block diagrams, but the communication-speed-limited user extraction apparatus and the throughput estimation apparatus may be implemented in hardware, software, or combinations thereof. For example, the embodiment of the present invention may be realized by a program for causing a computer to implement each function in the communication-speed-limited user extraction apparatus and the throughput estimation apparatus according to the embodiment of the present invention, a program for causing a computer to perform each step in the method according to the embodiment of the present invention, or the like. In addition, two or more functional elements may be combined as appropriate. The method according to the embodiment of the present invention may be carried out in a different order from the order shown in the embodiment.

While the solution is described above to extract a communication-speed-limited user based on communication histories, the present invention is not limited to the embodiments, but various modifications and applications can be made by those skilled in the art within the scope of the claims.

The present international application is based on and claims the benefit of priority of Japanese Patent Application No. 2015-112634 filed on Jun. 2, 2015, the entire contents of which are hereby incorporated by reference.

DESCRIPTION OF NOTATIONS 100 communication-speed-limited user extraction apparatus
110 communication-speed-limited user determination unit
111 syntactic analysis unit
112 history input unit
113 corresponding history extraction unit
114 outlier calculation unit
115 corresponding user communication history extraction unit
116 communication history calculation range extraction unit
117 testing unit
118 list update unit
120 communication history DB
130 communication-speed-limited user list
200 throughput estimation apparatus
210 communication speed estimation unit
211 syntactic analysis unit
212 communication-speed-limited user verification unit
213 communication speed calculation unit
214 response unit

The invention claimed is:

1. A communication-speed-limited user extraction apparatus for extracting a user whose communication speed is limited based on communication histories, comprising:
   processing circuitry; and
   a memory that includes instructions, that when executed by the processing circuitry, cause the processing circuitry to
   store the communication histories including throughput information on a user-by-user basis in the memory; and
   extract communication histories with a same communication environment at a communication date and time within a predetermined period of time from the memory and determine that a user with a different throughput distribution is the user whose communication speed is limited, the user with the different throughput distribution is determined by:
   extracting a plurality of communication histories of the user,
   determining the user's throughput distribution through measurements of the user's throughput at different frequencies,
   determining a network throughput distribution based on communication histories of other users within a same network as the user, and
   when the user's throughput distribution deviates from the network throughput distribution, the user is determined to have the different throughput distribution and is the user whose communication speed is limited.

2. The communication-speed-limited user extraction apparatus as claimed in claim 1, the instructions to cause the processing circuitry to
   input a user identifier, a carrier identifier, a network identifier, throughput information, and a communication date and time to the memory;

obtain throughput information with which a same carrier identifier and a same network identifier are associated at the communication date and time within the predetermined period of time from the memory; and
determine the throughput information of the user that is an outlier relative to the network throughput distribution and update a communication-speed-limited user list based on a result of determination of the outlier.

3. A throughput estimation apparatus for estimating throughput based on communication histories, comprising:
processing circuitry; and
a memory that includes instructions, that when executed by the processing circuitry, cause the processing circuitry to
store the communication histories on a user-by-user basis in the memory;
extract a communication history with a same communication environment at a communication date and time within a predetermined period of time from the memory and determine that a user with a different throughput distribution is a user whose communication speed is limited; and
estimate throughput regarding a communication speed in consideration of the user whose communication speed is limited,
wherein the user with the different throughput distribution is determined by:
extracting a plurality of communication histories of the user,
determining the user's throughput distribution through measurements of the user's throughput at different frequencies,
determining a network throughput distribution based on communication histories of other users within a same network as the user, and
when the user's throughput distribution deviates from the network throughput distribution, the user is determined to have the different throughput distribution and is the user whose communication speed is limited.

4. The throughput estimation apparatus as claimed in claim 3, wherein the instructions cause the processing circuitry to estimate throughput without using a communication history of users whose communication speed is limited for estimating a representative value of the throughput regarding the communication speed, and estimate throughput using the communication history of the user whose communication speed is limited for estimating throughput of the user whose communication speed is limited.

5. A communication-speed-limited user extraction method for extracting a user whose communication speed is limited based on communication histories, comprising:
extracting a communication history with a same communication environment at a communication date and time within a predetermined period of time from a memory that stores the communication histories including throughput information on a user-by-user basis; and
determining that a user with a different throughput distribution is the user whose communication speed is limited,
wherein the user with the different throughput distribution is determined by:
extracting a plurality of communication histories of the user,
determining the user's throughput distribution through measurements of the user's throughput at different frequencies,
determining a network throughput distribution based on communication histories of other users within a same network as the user, and
when the user's throughput distribution deviates from the network throughput distribution, the user is determined to have the different throughput distribution and is the user whose communication speed is limited.

6. A throughput estimation method for estimating throughput based on communication histories, comprising the steps of:
extracting a communication history with a same communication environment at a communication date and time within a predetermined period of time from a memory that stores the communication histories on a user-by-user basis;
determining that a user with a different throughput distribution is a user whose communication speed is limited; and
estimating throughput regarding a communication speed in consideration of the user whose communication speed is limited,
wherein the user with the different throughput distribution is determined by:
extracting a plurality of communication histories of the user,
determining the user's throughput distribution through measurements of the user's throughput at different frequencies,
determining a network throughput distribution based on communication histories of other users within a same network as the user, and
when the user's throughput distribution deviates from the network throughput distribution, the user is determined to have the different throughput distribution and is the user whose communication speed is limited.

7. A non-transitory computer readable storage medium for storing instructions, which when executed by processing circuitry, causes the processing circuitry to extract a user whose communication speed is limited based on communication histories, the instructions causing the processing circuitry to:
store the communication histories including throughput information on a user-by-user basis in a memory; and
extract a communication history with a same communication environment at a communication date and time within a predetermined period of time from the memory and determine that a user with a different throughput distribution is the user whose communication speed is limited,
wherein the user with the different throughput distribution is determined by:
extracting a plurality of communication histories of the user,
determining the user's throughput distribution through measurements of the user's throughput at different frequencies,
determining a network throughput distribution based on communication histories of other users within a same network as the user, and
when the user's throughput distribution deviates from the network throughput distribution, the user is determined to have the different throughput distribution and is the user whose communication speed is limited.

8. A non-transitory computer readable storage medium for storing instructions, which when executed by processing circuitry, causes the processing circuitry to estimate throughput based on communication histories, the instructions causing processing circuitry to:
- store the communication histories on a user-by-user basis in a memory;
- extract a communication history with a same communication environment at a communication date and time within a predetermined period of time from the memory and determine that a user with a different throughput distribution is a user whose communication speed is limited; and
- estimate throughput regarding a communication speed in consideration of the user whose communication speed is limited,
- wherein the user with the different throughput distribution is determined by:
  - extracting a plurality of communication histories of the user,
  - determining the user's throughput distribution through measurements of the user's throughput at different frequencies,
  - determining a network throughput distribution based on communication histories of other users within a same network as the user, and
  - when the user's throughput distribution deviates from the network throughput distribution, the user is determined to have the different throughput distribution and is the user whose communication speed is limited.

* * * * *